United States Patent
So et al.

(10) Patent No.: US 12,393,840 B2
(45) Date of Patent: Aug. 19, 2025

(54) GRANULAR NEURAL NETWORK ARCHITECTURE SEARCH OVER LOW-LEVEL PRIMITIVES

(71) Applicant: Google LLC, Mountain View, CA (US)

(72) Inventors: David Richard So, Brooklyn, NY (US); Quoc V. Le, Sunnyvale, CA (US); Hanxiao Liu, Santa Clara, CA (US); Wojciech Andrzej Manke, Zürich (CH); Zihang Dai, Pittsburgh, PA (US); Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/823,611

(22) Filed: Sep. 3, 2024

(65) Prior Publication Data

US 2024/0428071 A1     Dec. 26, 2024

Related U.S. Application Data

(63) Continuation of application No. 17/827,362, filed on May 27, 2022.

(60) Provisional application No. 63/194,889, filed on May 28, 2021.

(51) Int. Cl.
    *G06N 3/08*     (2023.01)
(52) U.S. Cl.
    CPC ..................... *G06N 3/08* (2013.01)

(58) Field of Classification Search
    CPC .......... G06N 3/044; G06N 3/04; G06N 3/042; G06N 3/0464; G06N 3/0455; G06N 3/045; G06N 3/047; G06N 3/0499; G06N 3/0475
    See application file for complete search history.

(56) References Cited

U.S. PATENT DOCUMENTS

| | | | |
|---|---|---|---|
| 10,452,978 B2 | 10/2019 | Shazeer et al. | |
| 10,997,503 B2 | 5/2021 | Dohan et al. | |
| 11,144,831 B2 | 10/2021 | Huang et al. | |
| 2020/0320399 A1 | 10/2020 | Huang et al. | |
| 2021/0150370 A1 | 5/2021 | McDonnell et al. | |

OTHER PUBLICATIONS

Vaswani et al., Attention is All You Need, 2017 (Year: 2017).*
Yang et al., GLoMo: Unsupervisedly Learned Relational Graphs as Transferable Representations, 2018 (Year: 2018).*
Wu et al., Pay Less Attention With Lightweight and Dynamic Convolutions, 2019 (Year: 2019).*
Hansson et al., Feedforward neural networks with ReLU activation functions are linear splines, 2017 (Year: 2017).*

(Continued)

*Primary Examiner* — David Yi
*Assistant Examiner* — Charles C Kuo
(74) *Attorney, Agent, or Firm* — Fish & Richardson P.C.

(57) ABSTRACT

Methods, systems, and apparatus, including computer programs encoded on computer storage media, for performing a machine learning task on a network input to generate a network output. One of the systems includes an attention neural network configured to perform the machine learning task. The attention neural network includes one or more attentions layers that each include a squared ReLU activation layer, a depth-wise convolution layer, or both.

21 Claims, 8 Drawing Sheets

(56) References Cited

OTHER PUBLICATIONS

Abadi et al., "TensorFlow: A System for Large-Scale Machine Learning," Proceedings of the 12th USENIX Symposium on Operating Systems Design and Implementation, Nov. 2016, 21 pages.
Adiwardana et al., "Towards a Human-like Open-Domain Chatbot," arXiv, Feb. 27, 2020, 38 pages.
Ba et al., "Layer normalization," arXiv, Jul. 21, 2016, 14 pages.
Baevski et al., "Adaptive Input Representations for Neural Language Modeling," arXiv, Feb. 22, 2019, 13 pages.
Bender et al., "Can Weight Sharing Outperform Random Architecture Search? An Investigation With TuNAS," Proceedings of the IEEE/CVF Conference on Computer Vision and Pattern Recognition (CVPR), Jun. 2020, pp. 14323-14332.
Brown et al., "Language Models are Few-Shot Learners," Advances in Neural Information Processing Systems, 2020, 25 pages.
Cai et al., "ProxylessNAS: Direct Neural Architecture Search on Target Task and Hardware," arXiv, Feb. 23, 2019, 13 pages.
Chelba et al., "One billion word benchmark for measuring progress in statistical language modeling," Interspeech, Sep. 2014, pp. 2635-2639.
Dauphin et al., "Language Modeling with Gated Convolutional Networks," Proceedings of the 34th International Conference on Machine Learning, 2017, 9 pages.
Devlin et al., "BERT: Pre-training of deep bidirectional transformers for language understanding," arXiv, May 24, 2019, 16 pages.
Elfadel, "On the stability of analog ReLU Networks," IEEE Transactions on Computer-Aided Design of Integrated Circuits and Systems, Dec. 3, 2020, 5 pages.
Elsken et al., "Efficient Multi-objective Neural Architecture Search via Lamarckian Evolution," arXiv, Feb. 26, 2019, 23 pages.
Elsken et al., "Neural architecture search: A survey," Journal of Machine Learning Research, Mar. 2019, 20(55):1-21.
Fedus et al., "Switch Transformers: Scaling to Trillion Parameter Models with Simple and Efficient Sparsity," arXiv, Jan. 11, 2021, 31 pages.
Gao et al., "Making Pre-trained Language Models Better Few-shot Learners," arXiv, Dec. 31, 2020, 15 pages.
Gulati et al., "Conformer: Convolution-augmented Transformer for Speech Recognition," Interspeech, Oct. 2020, 5 pages.
Hendrycks et al., "Bridging Nonlinearities and Stochastic Regularizers with Gaussian Error Linear Units," arXiv, Nov. 4, 2016, 10 pages.
International Search Report and Written Opinion in International Appln. No. PCT/US2022/031468, mailed on Oct. 14, 2022, 24 pages.
Jiang et al., "An ConvBert: Improving BERT with Span-based Dynamic Convolution," Advances in Neural Information Processing Systems, Dec. 2020, 12 pages.
Kaplan et al., "Scaling laws for neural language models," arXiv, Jan. 23, 2020, 30 pages.
Karnin et al., "Almost Optimal Exploration in Multi-Armed Bandits," Proceedings of the 30th International Conference on Machine Learning, 2013, 9 pages.
Krotov et al., "Dense Associative Memory for Pattern Recognition," Advances in Neural Information Processing Systems, 2016, 9 pages.
Li et al., "Hyperband: A novel bandit-based approach to hyperparameter optimization," Journal of Machine Learning Research, Apr. 2018, 18(185):1-52.
Li et al., "Random Search and Reproducibility for Neural Architecture Search," Proceedings of the 35th Uncertainty in Artificial Intelligence Conference, 2020, 11 pages.
Liu et al., "DARTS: Differentiable architecture search," arXiv, Apr. 23, 2019, 13 pages.
Liu et al., "RoBERTa: A Robustly Optimized BERT Pretraining Approach," arXiv, Jul. 26, 2019, 13 pages.
Narang et al., "Do Transformer Modifications Transfer Across Implementations and Applications?," arXiv, Sep. 10, 2021, 16 pages.
Patterson et al., "Carbon Emissions and Large Neural Network Training," arXiv, Apr. 23, 2021, 22 pages.
Pham et al., "Efficient neural architecture search via parameter sharing," arXiv, Feb. 12, 2018, 11 pages.
Radford et al., "Language models are unsupervised multitask learners," Technical Report, OpenAI, 2019, 24 pages.
Raffel et al., "Exploring the limits of transfer learning with a unified text-to-text transformer," arXiv, Jul. 28, 2020, 67 pages.
Ramachandran et al., "Searching for Activation Functions," arXiv, Oct. 27, 2017, 13 pages.
Real et al., "AutoML-Zero: Evolving Machine Learning Algorithms From Scratch," Proceedings of the 37th International Conference on Machine Learning, 2020, 13 pages.
Real et al., "Large-Scale Evolution of Image Classifiers," Proceedings of the 34th International Conference on Machine Learning, 2017, 10 pages.
Real et al., "Regularized Evolution for Image Classifier Architecture Search," Proceedings of the AAAI Conference on Artificial Intelligence, Jul. 17, 2019, pp. 4780-4789.
Schick et al., "It's Not Just Size That Matters: Small Language Models Are Also Few-Shot Learners," arXiv, Apr. 12, 2021, 14 pages.
Schmidhuber, "Evolutionary Principles in Self-Referential Learning. On Learning now to Learn: The Meta-Meta-Meta . . . —Hook," Diploma thesis, Technische Universitat Munchen, Germany, May 14, 1987, 63 pages.
Shazeer et al., "Mesh-TensorFlow: Deep Learning for Supercomputers," Advances in Neural Information Processing Systems, 2018, 10 pages.
Shazeer, "Glu variants improve transformer," arXiv, Feb. 12, 2020, 5 pages.
So et al., "The Evolved Transformer," Proceedings of the 36th International Conference on Machine Learning, 2019, 10 pages.
Stanley et al., "Designing neural networks through neuroevolution," Nature Machine Intelligence, Jan. 7, 2019, 1:24-35.
Sutskever et al., "Sequence to Sequence Learning with Neural Networks," Advances in Neural Information Processing Systems, 2014, 9 pages.
Tan et al., "EfficientNet: Rethinking Model Scaling for Convolutional Neural Networks," Proceedings of the 36th International Conference on Machine Learning, 2019, 10 pages.
Tan et al., "MnasNet: Platform-Aware Neural Architecture Search for Mobile," Proceedings of the IEEE/CVF Conference on Computer Vision and Pattern Recognition, Jun. 2019, pp. 2820-2828.
Tay et al., "Synthesizer: Rethinking Self-Attention in Transformer Models," arXiv, Oct. 6, 2020, 13 pages.
Vaswani et al., "Attention is all you need," arXiv, Dec. 6, 2017, 15 pages.
Vaswani et al., "Tensor2tensor for neural machine translation," arXiv, Mar. 16, 2018, 9 pages.
Wang et al., "Entailment as Few-Shot Learner," arXiv, Apr. 29, 2021, 15 pages.
Wu et al., "CvT: Introducing Convolutions to Vision Transformers," arXiv, Mar. 29, 2021, 10 pages.
Xiong et al., "On layer normalization in the transformer architecture," arXiv, Jun. 29, 2020, 17 pages.
Yang et al., "XLNet: Generalized Autoregressive Pretraining for Language Understanding," Advances in Neural Information Processing Systems, 2019, 11 pages.
Yang et al., GLoMo: Unsupervisedly Learned Relational Graphs as Transferable Representations, 2018.
Yao, "Evolving artificial neural networks," Proceedings of the IEEE, Sep. 1999, 87(9):1423-1447.
Yu et al., "Evaluating the Search Phase of Neural Architecture Search," ICLR, 2020, 16 pages.
Yu et al., "QANet: Combining Local Convolution with Global Self-Attention for Reading Comprehension," ICLR, Feb. 15, 2018, 16 pages.
Zhang et al., "Root Mean Square Layer Normalization," Advances in Neural Information Processing Systems, 2019, 12 pages.
Zhu et al., "An Empirical Study of Spatial Attention Mechanisms in Deep Networks," Proceedings of the IEEE/CVF International Conference on Computer Vision (ICCV), Oct. 2019, pp. 6688-6697.

(56) References Cited

OTHER PUBLICATIONS

Xu et al., "Efficient Transformer for Remote Sensing Image Segmentation," Remote Sensing, Sep. 2021, 13(18):3585, 24 pages.

* cited by examiner

GRANULAR NEURAL NETWORK ARCHITECTURE SEARCH OVER LOW-LEVEL PRIMITIVES

CROSS-REFERENCE TO RELATED APPLICATION

This application is a continuation of U.S. patent application Ser. No. 17/827,362, filed May 27, 2022, which claims priority to U.S. Provisional Application No. 63/194,889, filed on May 28, 2021. The disclosure of the prior applications are considered part of and are incorporated by reference in the disclosure of this application.

BACKGROUND

This specification relates to determining architectures for neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural architecture search system implemented as computer programs on one or more computers in one or more locations that determines a network architecture for a neural network that is configured to perform a particular machine learning task.

Particular embodiments of the subject matter described in this specification can be implemented so as to realize one or more of the following advantages.

The described techniques allow for a neural network architecture search system to construct an open-ended search space that is composed of largely degenerate neural network architecture components from any of a variety of existing neural network architectures, and thereafter automatically and effectively determine a final architecture from the search space for a neural network for performing a given machine learning task. In particular, the described techniques allow for the system to focus on improvements to primitive components, rather than high-level building blocks, of the final architecture during the search process.

As one example of improvements to an architecture of a neural network that includes an attention mechanism, inserting a squared function after a ReLU activation function and thus creating a new type of feed-forward sub-layer for use in the network can improve the nonlinear transformation within the network without additional parameters. As another example of improvements, inserting a depth-wise convolution function after each key, query, or value linear transformation function and thus creating a new type of attention sub-layer for use in the network can increase the representation power of network.

Training of the neural network having the final architecture may therefore require fewer computational resources, e.g. reduced processor cycles, reduced wall clock time, reduced power consumption, and the computational efficiency of training is therefore improved. Furthermore, the neural network having the final architecture may exhibit improved data efficiency, requiring fewer training steps and/or examples of training data to reach a desired level of performance compared to existing architectures. In addition, the trained instance of the neural network is lightweight (i.e., parameter-efficient) and yet high-performing. Once trained, the neural network is able to achieve performance on a wide range of machine learning tasks competitive with or even exceeding state-of-the-art models despite having relatively smaller model sizes, thus being suitable for deployment on hardware platforms with limited computational resources, including, for example, mobile devices and embedded systems.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
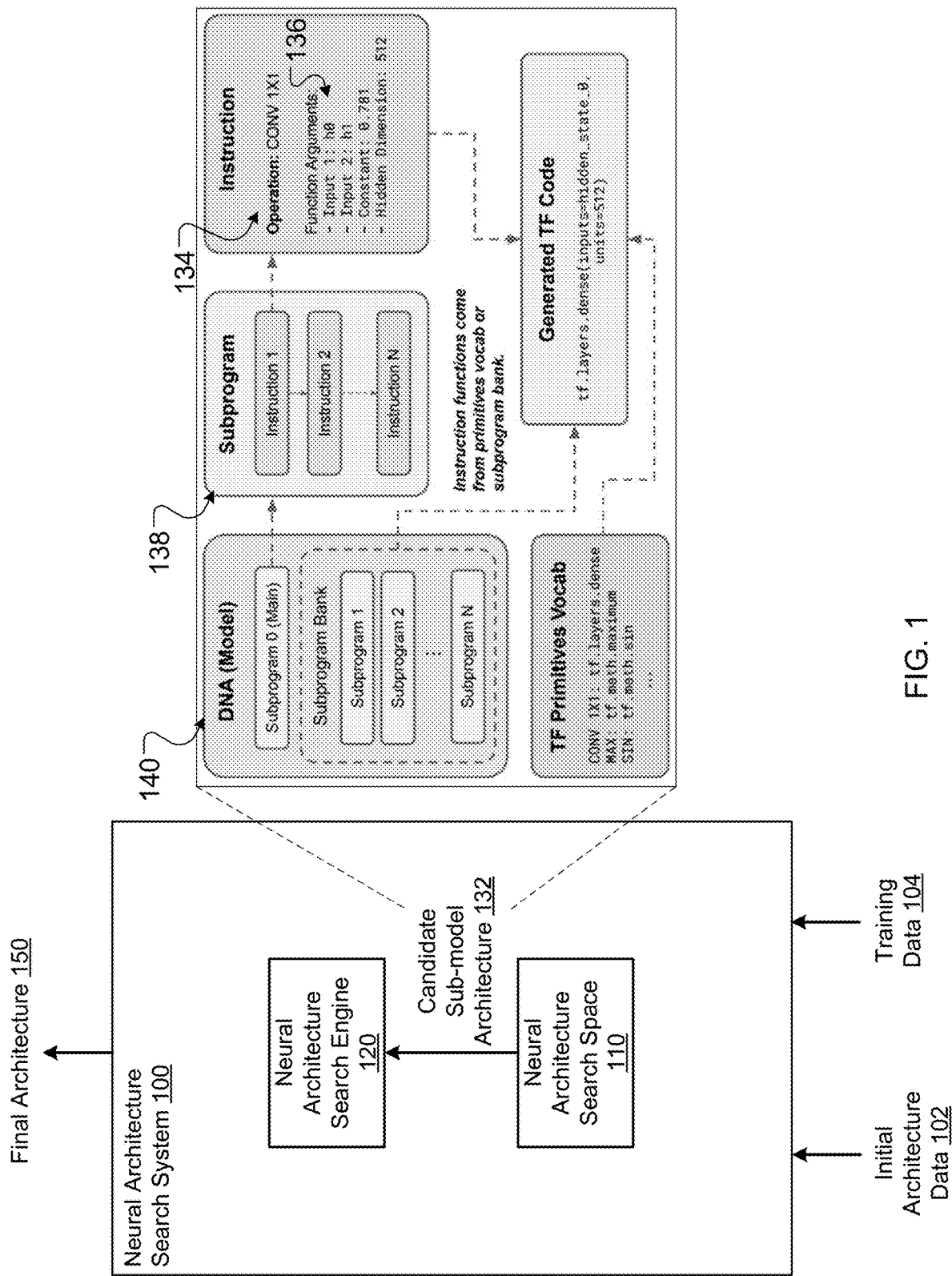
FIG. 1 shows an example neural architecture search system.

This specification describes a neural architecture search system implemented as computer programs on one or more computers in one or more locations that determines a network architecture for a neural network that is configured to perform a particular machine learning task. Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language-target language pairs. In this example, the source language text may be augmented with an identifier that indicates the target language into which the neural network should translate the source language text.

As another example, the task may be an audio processing task. For example, if the input to the neural network is a sequence representing a spoken utterance, e.g., a spectrogram or a waveform or features of the spectrogram or waveform, the output generated by the neural network may be a piece of text that is a transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. The sequence derived from the electronic health record data for the patient may comprise physiological measurements, e.g. a sequence of physiological measurements.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be a computer vision task, where the input is an image or a point cloud and the output is a computer vision output for the image or point cloud, e.g., a classification output that includes a respective score for each of a plurality of categories, with each score representing the likelihood that the image or point cloud includes an object belonging to the category. When the input is an image or point cloud, the neural network can include an embedding subnetwork that generates a respective embedding for each multiple patches of the image or point cloud, and the input to the first block of the neural network can be a sequence that includes the respective embeddings (and, optionally, one or more additional embeddings, e.g., at a predetermined position that will later be used to generate the output). Each patch includes the intensity values of the pixels in a different region of the input image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

FIG. 1 shows an example neural architecture search system 100. The neural architecture search system 100 is an example of a system implemented as computer programs on one or more computers in one or more locations, in which the systems, components, and techniques described below can be implemented.

The neural architecture search system 100 is a system that obtains initial neural network architecture data 102, generates a neural architecture search space 110 from the initial neural network architecture data 102, and subsequently determines an architecture 150 for a neural network by searching through the neural architecture search space 110. The search space 110 is composed of multiple primitive neural network operations 134, where each primitive neural network operation is associated with one or more tunable operation parameters 136. For each primitive neural network operation, the tunable operation parameters generally define how the operation should be applied. The tunable operation parameters can each have a predetermined set of possible values. Some operation parameters can have numerical values that may be any value within some range, e.g., real valued constant values, while other operation parameters that can only take one of a small number of possible values, e.g., integer index values.

As used herein, a primitive neural network operation is an operation that corresponds to a basic mathematical concept. For example, the primitive neural network operations that make up the neural architecture search space 110 can include maximization, sinusoid, sigmoid, logarithmic, addition, multiplication, including matrix multiplication, convolution, including depth-wise convolution, shift, scale, mask, and the like. In contrast, more complicated operations that can be performed by a neural network, such as layer normalization and residual connection, are not primitive neural network operations, but can be constructed from a combination of two or more primitive neural network operations.

For each primitive neural network operation, the tunable operation parameters can include one or more of:

Input 1: a first input parameter identifying the data that should be used as the first input for the operation. For example, Input 1 can be the index of another operation that generates the first input as output. Any operation that receives at least one input can use this parameter.

Input 2: a second input parameter identifying the data that should be used as the second input for the operation. An example of an operation that uses this parameter is addition (ADD).

Constant: A real value constant. An example of an operation that uses this is maximization (MAX). For example, a ReLU activation can be represented by MAX(x, C) with C=0 being the constant.

Dimension Size: An integer representing the output dimension size for transformations that utilize weight matrices. An example of an operation that uses this parameter is 1×1 convolution (CONV 1×1).

Each primitive neural network operation can map to a set of one or more lines of computer program code, i.e., a function, and the tunable operation parameters can map to the arguments of the function. For example, as shown in FIG. 1, an operation of "CONV 1×1" with operation parameters "Input 1: h0; Input 2: h1; Constant: 0.781; Dimension Size: 512" can map to the following TensorFlow (TF) code (with inapplicable operation parameters discarded):

tf.layers.dense (inputs=hidden_state_0, units=512).

From the search space 110, the system uses a neural architecture search engine 120 to determine an architecture 140 for a neural network that is configured to perform the particular machine learning task.

In particular, the system 100 is configured to determine a network architecture for a neural network by determining an architecture of each of multiple sub-model architectures 138 which may be stacked in a given order to perform successive operations on a network input to generate a network output. Each sub-model architecture in turn includes an ordered set of primitive neural network operations. The number of primitive neural network operations within the multiple sub-model architectures may differ. A same sub-model architecture may be repeated in the network architecture, i.e., the neural network may have multiple instances of the same sub-model architecture.

The system can determine the number of sub-model architectures in the neural network. The system can also determine the operations performed by each of the sub-model architectures, i.e., which primitive neural network operations are included in the sub-model architecture, how the primitive neural network operations are ordered in the sub-model architecture, or both. The system can also determine the connectivity between the primitive neural network operations in each sub-model architecture, i.e., which primitive neural network operations receive inputs from which other primitive neural network operations in the sub-model architecture. The system can further determine the connectivity between the sub-model architectures in the neural network, i.e., which sub-model architecture receive inputs from which other sub-model architectures in the neural network.

Generally, the system 100 determines the architecture for the neural network by repeatedly modifying the multiple sub-model architectures, thereby generating a set of candidate architectures for the neural network, and evaluating the performance of the neural network having each candidate architecture in the set on the task.

Figure 2:
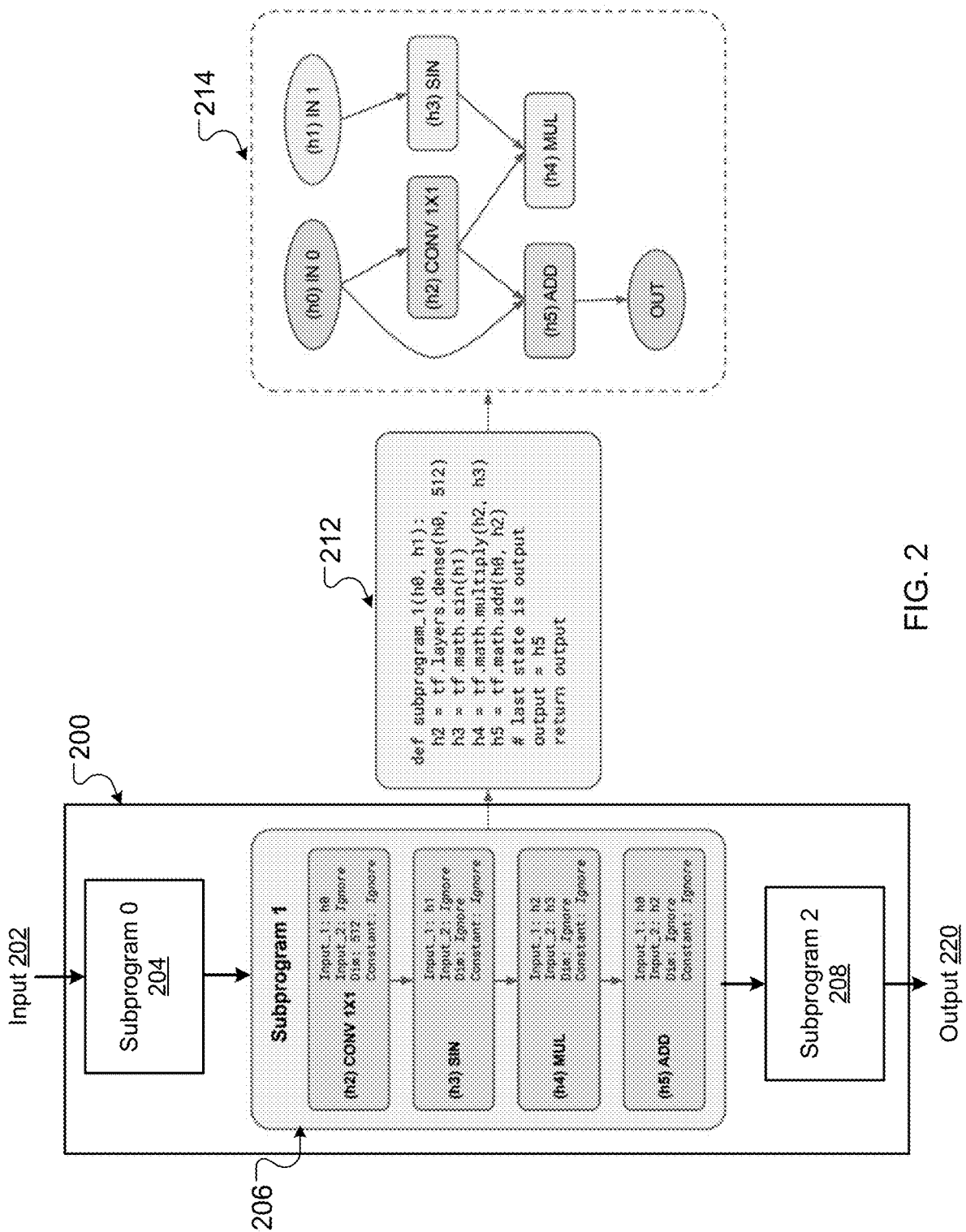
FIG. 2 shows an example illustration of an architecture of neural network.

FIG. 2 shows an architecture of an example neural network 200. The neural network 200 is configured to receive a network input 202 and to generate a network output 220 for the input 202.

The neural network 200 includes a stack of sub-model architectures. The stack includes multiple sub-model architectures, e.g., sub-model architectures 204, 206, and 208 ("subprogram 0", "subprogram 1", and "subprogram 2"), that are stacked one after the other in a given order. While FIG. 2 shows a total of three sub-model architectures, the neural network 200 can have fewer or more sub-model architectures. The sub-model architectures in the stack can have the same or different numbers of primitive neural network operations included in each sub-model architecture.

Although the sub-model architectures are illustrated as arranged in a sequence (with the output of any sub-model architecture except the last being an input to another of the sub-model architectures), the sub-model architectures can also be arranged in parallel, where two or more sub-model architectures receive the same input.

For example, the sub-model architecture 206 includes an ordered set of four primitive neural network operations: a 1×1 convolution operation (CONV 1×1) followed by a sinusoid operation (SIN) followed by a multiplication operation (MUL) followed by an addition operation (ADD). The primitive neural network operations can be indexed as h2-h5 according to their position in the ordered set, where indices h0-h1 are reserved for the first and second inputs for the sub-model architecture 206 itself. Here each index can have a non-negative integer value.

In this example, the system uses the neural architecture search engine 120 to determine a value for each of the one or more operation parameters of the primitive neural network operations included in the sub-model architecture 206. For example, the system can determine input(s) for a given primitive neural network operation, e.g., the inputs for the multiplication operation, by determining the indices for one or more earlier primitive neural network operations in the ordered set that generate the inputs, e.g., by determining h2 and h3 as the values for the operation parameters associated with the multiplication operation.

The sub-model architecture 206 can then be converted to actual computer program code 212 that defines a part of the architecture of the neural network. The sub-model architecture 206 can also map to a computation graph 214 that has nodes representing the primitive neural network operations, and edges between the nodes representing the data flow between the primitive neural network operations. For example, the computation graph can be a computation graph for execution by a graph-based machine learning framework, e.g., TensorFlow framework.

Depending on the specific goals and objectives of the neural architecture search process, the neural architecture search engine 120 can run any of a variety of neural architecture search algorithms, including random search, Bayesian optimization, evolutionary algorithms, reinforcement learning (RL), and gradient-based algorithms.

For example, in the cases where the goal is to find the most training efficient architecture in the search space, i.e., a neural network architecture can achieve the state-of-the-art at a smaller training cost, the neural architecture search engine 120 can run an evolutionary architecture search algorithm. Example evolutionary architecture search algorithms include a regularized evolution search algorithm and an evolution algorithm with progressive dynamic hurdles, described in more detail U.S. Pat. No. 11,144,831 B2, entitled Regularized Neural Network Architecture Search, which was filed on Jun. 19, 2020 and issued on Oct. 12, 2021, and U.S. Pat. No. 10,997,503 B2, entitled Computationally Efficient Neural Network Architecture Search, which was filed on Jun. 20, 2019 and issued on May 4, 2021, respectively, which are herein incorporated by reference.

Some other example of search algorithms that can be run by the neural architecture search engine 120 include a reinforcement learning-based search algorithm described in Pham, et al, Efficient Neural Architecture Search via Parameter Sharing, arXiv: 1802.03268, and gradient descent-based search algorithm described in Liu, et al, DARTS: Differentiable Architecture Search, arXiv: 1806.09055, which are herein incorporated by reference.

The system 100 also obtains training data 104 for training a neural network to perform the particular task and, in some cases, a validation set for evaluating the performance of the neural network on the particular task.

Generally, the training data and the validation set both include a set of neural network inputs and, for each network input, a respective target output that should be generated by the neural network to perform the particular task. For example, a larger set of training data may have been randomly partitioned to generate the training data and the validation set.

The system can receive the initial neural network architecture data 102 and the training data 104 in any of a variety of ways. For example, the system can receive the training data as an upload from a remote user of the system over a data communication network, e.g., using an application programming interface (API) made available by the system, and randomly divide the uploaded data into the training data and the validation set. As another example, the system can receive an input from a user specifying which data that is already maintained by the system, or another system that is accessible by the system, should be used as the initial neural network architecture data 102, the training data 104, or both.

In some cases, the initial neural network architecture data 102 received by the system 100 can include data that defines a vocabulary of primitive neural network operations, and the system just uses the received data as-is to construct the neural architecture search space 110. In other cases, the initial architecture data 102 can include data that defines one or more known network architectures, and the system can first convert the known architecture(s) into multiple primitive operations that make up the architecture(s), and then use the converted primitive operations to construct the neural architecture search space 110.

For example, the initial neural network architecture data 102 may define an architecture of an attention-based neural network, i.e., a neural network that includes one or more attention layers. As used herein an attention layer is a neural network layer which includes an attention mechanism, e.g., a self-attention mechanism, e.g., a multi-head self-attention mechanism. More details about the attention mechanism will be described further below with reference to FIG. 4.

In this example and other similar examples where the initial neural network architecture data 102 defines an architecture of a convolutional neural network, a recurrent neural network, or the like, the system can partition the known architecture into multiple sub-model architectures that each have an initial ordered set of primitive neural network operations and that each correspond to a functional component of the architecture. For example, the system can generate one sub-model architecture that corresponds to the attention layer, one sub-model architecture that corresponds to the ReLU activation layer, and another sub-model architecture that corresponds to the layer normalization layer. Each sub-model architecture includes an initial ordered set of one or more primitive neural network operations that facilitate the original operations performed by the corresponding functional architecture component.

After the search process has terminated, e.g., after a specified amount of time has elapsed since the beginning of the search process or after the performance of the neural network having a determined architecture has reached a specified threshold, the neural network search system 100 can then output final architecture data 150 of a neural network. For example, the neural network search system 100 can output data specifying the final neural network architecture 150 to the user that submitted the initial architecture data 102. For example, the architecture data can specify the neural network operators that are part of the neural network, the connectivity between the neural network operations, and the operations performed by the neural network operators.

In some implementations, instead of or in addition to outputting the architecture data 150, the system 100 instantiates an instance of the neural network having the determined architecture and with trained parameters, e.g., either trained from scratch by the system after determining the final architecture, making use of the parameter values generated as a result of the search process, or generated by fine-tuning the parameter values generated as a result of the search process, and then uses the trained neural network to process requests received by users, e.g., through the API provided by the system. That is, the system 100 can receive inputs to be processed, use the trained neural network to process the inputs, and provide the outputs generated by the trained neural network or data derived from the generated outputs in response to the received inputs.

Figure 3:
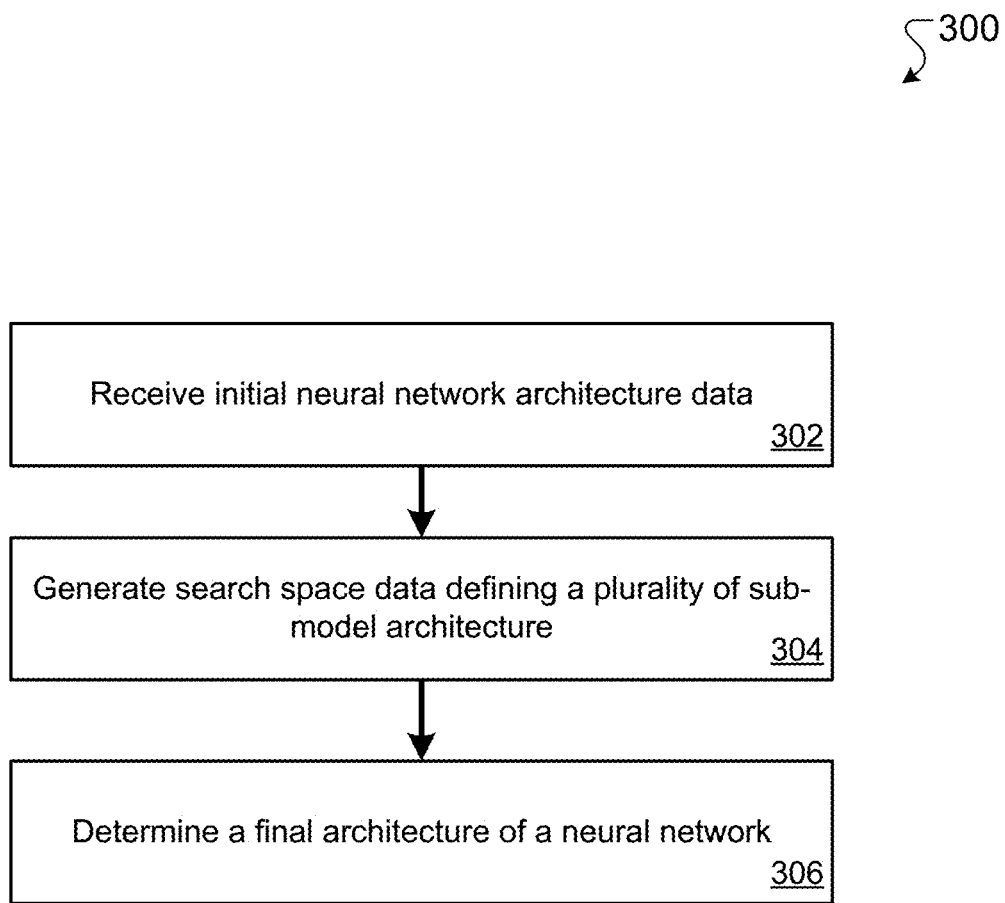
FIG. 3 is a flow diagram of an example process for searching for an architecture for a neural network.

FIG. 3 is a flow diagram of an example process 300 for searching for an architecture for a neural network. For convenience, the process 300 will be described as being performed by a system of one or more computers located in one or more locations. For example, a neural architecture search system, e.g., the neural architecture search system 100 of FIG. 1, appropriately programmed, can perform the process 300.

The system receives initial neural network architecture data (step 302). In some cases, the initial neural network architecture data received by the system can include data that defines a vocabulary of primitive neural network operations while in other cases, the initial architecture data can include data that defines one or more known network architectures, e.g., a known architecture of an attention-based neural network, a convolutional neural network, a recurrent neural network, or the like.

The system generates, from the initial neural network architecture data, search space data (step 304). The search space refers to a space of candidate network architectures from which a final architecture of a neural network may be determined. In particular, the system generates search space data that defines a plurality of sub-model architectures. Each sub-model architecture includes an ordered set of one or more primitive neural network operations. Each primitive neural network operation is associated with one or more operation parameters. Each operation parameter has a predetermined set of possible values.

In the cases where the initial architecture data includes data that defines one or more known network architectures, the system can first convert, e.g., partition, the known architecture(s) into multiple sub-model architectures that make up the architecture(s), and then use the converted sub-model architectures to construct the neural architecture search space.

The system determines the final architecture of the neural network for performing a machine learning task (step 306). Generally, the system can run any of a variety of neural architecture search algorithms over the search space data to search through the space of candidate network architectures to determine the final architecture. By running an appropriate neural architecture search algorithm, the system can identify a respective optimized value for each of the one or more operation parameters of the primitive neural network operations included in one or more of the plurality of sub-model architectures, which are then used to compose the final architecture of the neural network.

In some implementations, the system can run an evolutionary architecture search algorithm. For example, the evolutionary architecture search algorithm can include a regularized evolution algorithm or an evolution algorithm with progressive dynamic hurdles.

Running the evolutionary architecture search algorithm involves generating a population of candidate neural network architectures from the search space data and maintaining, for each candidate neural network architecture in the population, a measure of fitness representing a performance of the neural network having the candidate neural network architecture on the machine learning task. To determine the measure of fitness, after generating each new candidate architecture, the system trains an instance of a neural network having the new candidate architecture on a training subset of the training data. The system trains the instance of the neural network for a certain amount of time until termination criteria for the training are satisfied, e.g., until a next training checkpoint is reached.

The measure of fitness can be determined by any metric that is appropriate for the machine learning task and that measures the performance of the neural network on the machine learning task, i.e., that measures how well the trained new neural network performs the machine learning task. For example, if the task is an image processing task, metrics can include various classification errors, intersection-over-union measures, reward or return metrics, and so on. As another example, if the task is a natural language processing task, metrics can include bilingual evaluation understudy (BLEU) scores, recall-oriented understudy for gisting evaluation (ROUGE) scores, perplexity, and so on.

During the search process, the measure of fitness for each candidate architecture can be used to determine the amount of computational resources to be devoted to the training of a neural network having the candidate architecture, for example the training of a neural network may be terminated early if its measure of fitness fails to satisfy a specific threshold value upon reaching a training checkpoint. Once the search process is complete, the measure of fitness for each candidate architecture can also be used to determine the final architecture of the neural network for performing the machine learning task, for example a candidate architecture having the best measure of fitness may be selected as the final architecture.

To generate the population of candidate neural network architectures, the system can first sample a candidate sub-model architecture from the search space data and, for the sampled candidate sub-model architecture, select a candidate primitive neural network operation included in the candidate sub-model architecture with uniform randomness. The system can then determine a candidate neural network architecture that includes at least the sampled candidate sub-model architecture and configured to perform at least the selected candidate primitive neural network operation. To create new candidate neural network architectures during the search process, the system can repeatedly modifying architectures in the set of candidate architectures by applying one or more mutations to the candidate architecture.

Applying the mutations to the candidate neural network architecture can include modification of a candidate operation parameter associated with the candidate primitive neural network operation, or modification of a value associated with the candidate operation parameter. The modified values can be selected from the predetermined set of possible values associated with the candidate operation parameter.

Applying the mutations can include deletion of the candidate primitive neural network operation.

Applying the mutations can include insertion of an additional primitive neural network operation that is sampled with uniform randomness from the search space data into the candidate sub-model architecture.

Applying the mutations can further include modification of the candidate primitive neural network operation using another primitive neural network operation included in the candidate sub-model architecture. That is, the position of two primitive operations included in the candidate sub-model architecture are swapped to create new candidate architectures.

Figure 4:
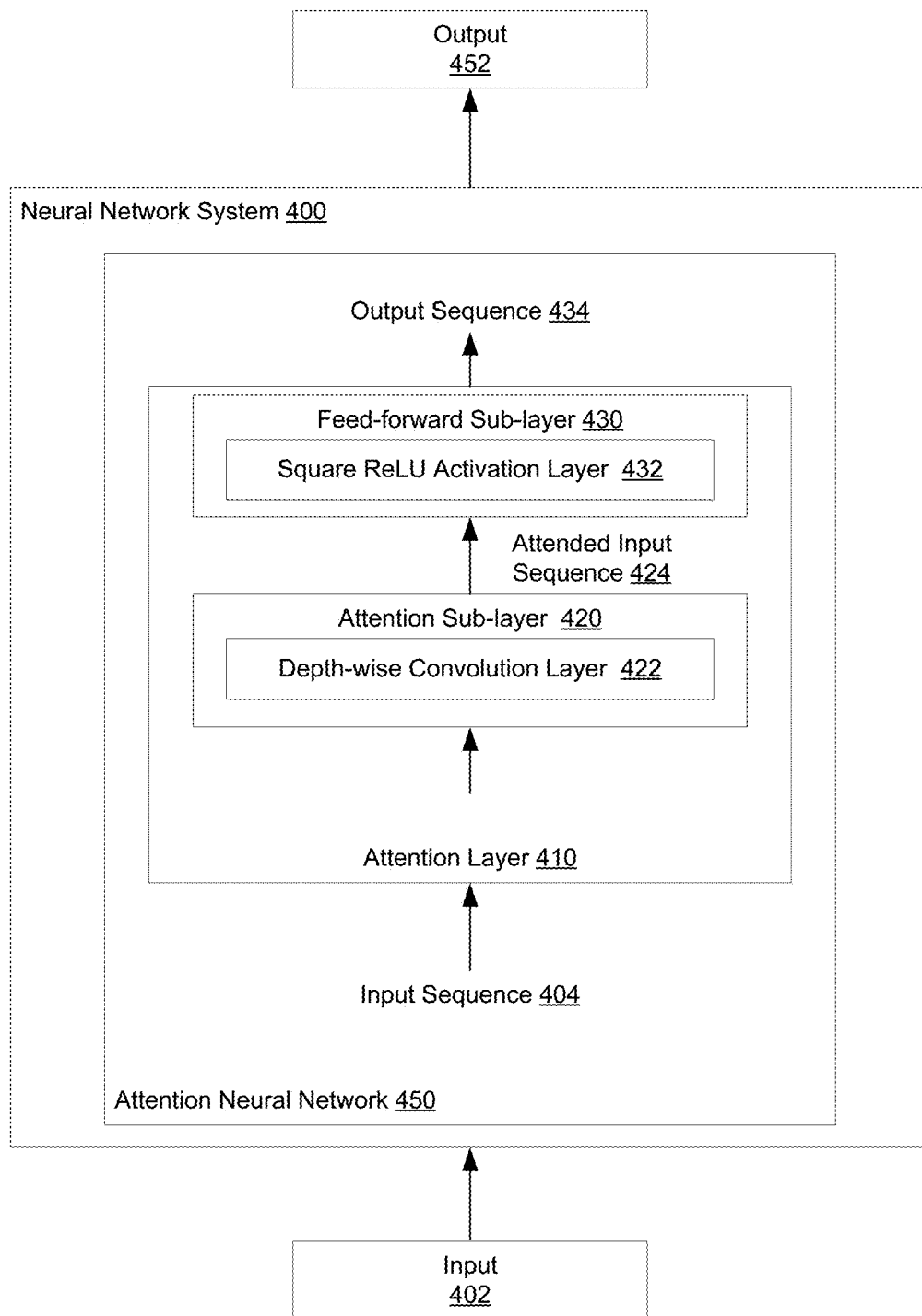
FIG. 4 shows an example neural network system.

FIG. 4 shows an example neural network system 400. The neural network system 400 is an example of a system implemented as computer programs on one or more computers in one or more locations, in which the systems, components, and techniques described below can be implemented.

The neural network system 400 includes an attention neural network 450 having an architecture that is determined by using the neural architecture search techniques described in this specification.

The neural network system 400 can receive an input 402 and perform a machine learning task on the input 402 to generate an output 452. The machine learning task can be any of the tasks mentioned above.

The attention neural network 450 includes multiple attention layers 410. Each attention layer 410 operates on an input sequence 404 and generates a corresponding output sequence 434.

Although one attention layer is depicted in FIG. 4 for convenience, as described above, the attention neural network 450 generally includes many other layers, including, for example, embedding layers, output layer, and other attention layers.

Specifically, the input sequence 404 has a respective layer input at each of one or more input positions in an input order and the output sequence 434 has a respective layer output at each of one or more output positions in an output order. That is, the input sequence 402 has one or more layer inputs arranged according to an input order and the output sequence 434 has one or more layer outputs arranged according to an output order.

In general, the input sequence 404 can be any intermediate sequential data generated by the attention neural network 450 when performing the machine learning task on the input 402. For example, the input sequence 404 can be embedded (i.e., numeric) representations of the input 402 generated by an embedding layer. As another example, the input sequence 404 can be an output sequence generated by a preceding attention layer or other layer in the attention neural network 450. As another example, when the attention neural network 450 generates the network output autoregressively, the input sequence 404 can be embedded representations of the currently generated network output as of the current time step.

To generate the output sequence 434 from the input sequence 404, each attention layer 410 includes an attention sub-layer 420 and a feed-forward sub-layer 430.

The attention sub-layer 420 receives the input sequence 404 for the layer 410 and applies an attention mechanism on the input sequence for the layer to generate an attended input sequence 424.

Generally, to apply the attention mechanism, the attention sub-layer 420 uses one or more attention heads. Each attention head generates a set of queries Q, a set of keys K, and a set of values V, and then applies a particular variant of query-key-value (QKV) attention using the queries, keys, and values to generate an output. Each query, key, or value can be in the form of a vector. In particular, the attention sub-layer 420 includes one or more depth-wise convolution layers 422, e.g., one or more depth-wise convolution layers for each attention head. The particular variant of attention applied by the attention head thus differs from conventional attention in that the attention head additionally processes the sets of queries, keys, and values by using the depth-wise convolutional layer, prior to directly applying an attention mechanism to the sets of queries, keys, and values to generate an output. When there are multiple attention heads, the attention sub-layer 120 then combines the outputs of the multiple attention heads, e.g., by concatenating the outputs and, optionally, processing the concatenated outputs through a linear layer.

Figures 5A, 5B:
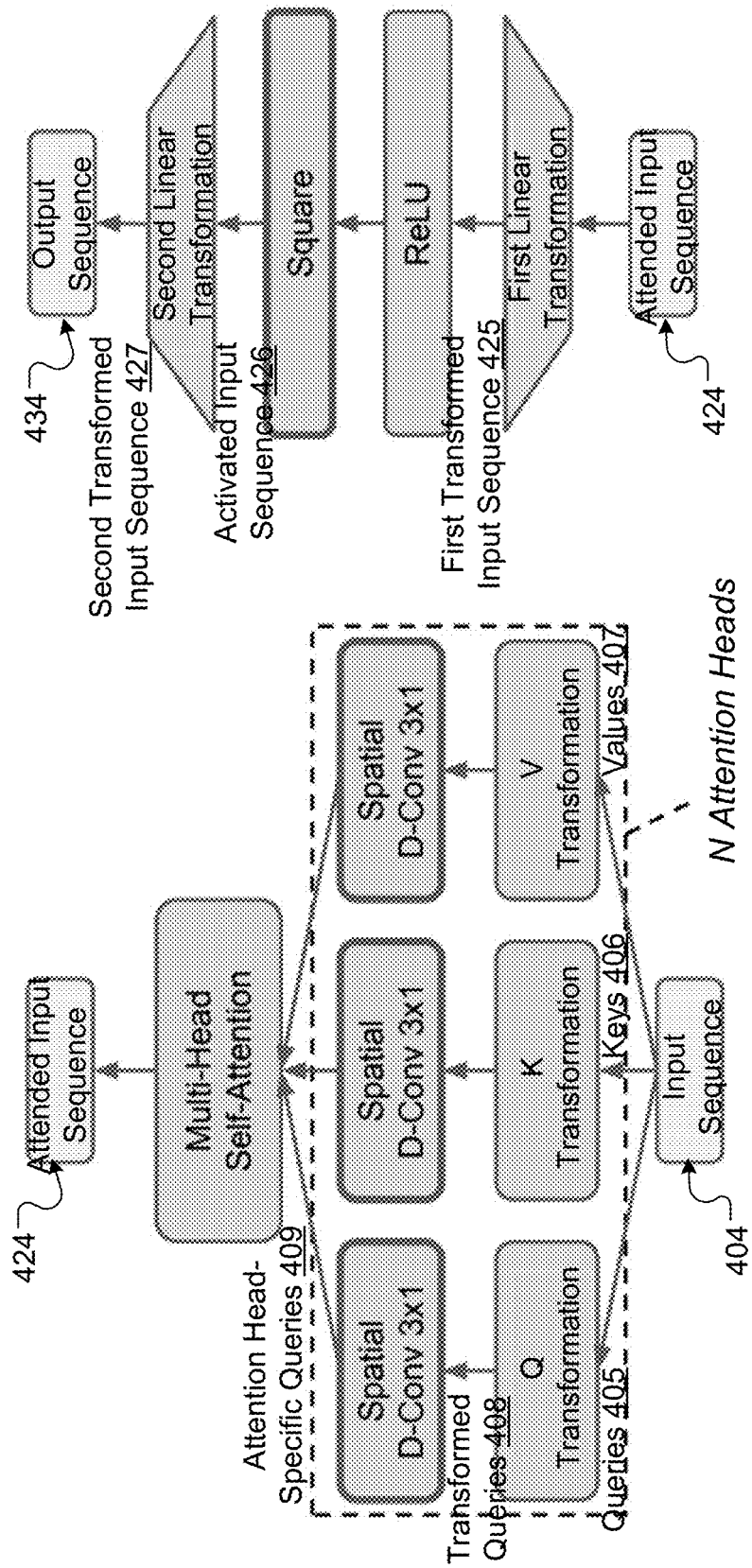
FIGS. 5A-B show an example of the operations performed by the feed-forward sub-layer of an attention layer.

FIG. 5A shows the operations performed by the attention sub-layer 420 for the input sequence 404. The attention sub-layer 420 includes multiple attention heads that can perform these operations, e.g., in parallel, for the input sequence to generate the attended input sequence 424 for the attention sub-layer.

To implement multi-head attention, the attention sub-layer 420 applies n attention mechanisms in parallel. In other words, the attention sub-layer includes n attention heads, with each attention head receiving the same original queries Q 405, original keys K 406, and original values V 407. Different attention heads in the attention sub-layer will generally apply different attention mechanisms. These original queries Q 405, original keys K 406, and original values K 407 are derived from the input sequence 404 of the attention sub-layer 420.

Each attention head is configured to transform the original queries, and keys, and values using learned transformations and then apply an attention mechanism to the transformed queries, keys, and values. Each attention head will generally learn different transformations from each other attention head.

As used in this specification, the term "learned" means that an operation or a value has been adjusted during the training of the attention neural network 450.

In conventional query-key-value (QKV) attention, each attention head is configured to apply a learned query Q linear transformation to each original query to generate an attention head-specific query for each original query, apply a learned key K linear transformation to each original key to generate an attention head-specific key for each original key, and apply a learned value V linear transformation to each original value to generate an attention head-specific values for each original value. The attention head then applies the attention mechanism using these attention head-specific queries, keys, and values to generate initial outputs for the attention sub-layer 420.

The attention mechanism applied by the attention sub-layer 420 depends on the configuration of the attention neural network 450.

As one example, when the network input is an input sequence, the attention neural network 450 includes an encoder neural network that includes a subset of the plurality of layers and that encodes the input sequence to generate a respective encoded representation of each input in the sequence. In this example, the attention mechanism applied by the attention sub-layers 420 in the encoder is a self-attention mechanism, e.g., a multi-head self-attention mechanism, where the queries, keys, and values are all generated from the input sequence to the attention sub-layer.

As another example, the attention neural network 450 includes a decoder neural network that includes a different subset of the plurality of layers and that processes either the network input or the encoded representation of the network input to generate the network output. In some of these examples, when the network output is an output sequence, the decoder neural network operates auto-regressively and the attention sub-layers 420 within some or all of the layers of the decoder apply masked self-attention over the partially generated output sequence, where the queries, keys, and values are all generated from the input sequence to the attention sub-layer 420.

When the neural network 450 includes both an encoder and a decoder, some of the layers in the decoder apply cross-attention into the encoded representations while others apply self-attention over the output sequence, either masked or not masked. In cross-attention, the queries are generated from the input sequence to the attention sub-layer 420 while the keys and values are generated from the encoded representations of the network input.

When the attention neural network 450 includes a decoder neural network that operates directly on the input sequence, the attention sub-layers 420 within the decoder can apply a self-attention mechanism over the input sequence.

More details of conventional query-key-value (QKV) attention are described in Vaswani, et al, *Attention Is All You Need*, arXiv: 1706.03762, Raffel, et al, *Exploring the Limits of Transfer Learning with a Unified Text-to-Text Transformer*, arXiv: 1910.10683, Devlin et al, BERT: *Pre-training of Deep Bidirectional Transformers for Language Understanding*, arXiv: 1810.04805, which are herein incorporated by reference.

In the described attention neural network 450, however, each attention head additionally applies a respective depth-wise convolution function in order to generate the attention head-specific queries, keys, or values which are subsequently used by the attention mechanism to generate initial outputs for the attention sub-layer. In other words, the attention head first applies a learned query Q linear transformation to each original query to generate a transformed query 408, and then applies a learned depth-wise convolution transformation to the transformed query to generate the attention head-specific query 409 for each original query. The use of convolution transformation increases the representation power of the attention neural network. The attention head-specific keys and values are similarly generated by using both the learned linear transformations and the learned depth-wise convolution transformations.

In the example of FIG. 5A, the depth-wise convolution layer is a depth-wise 2-D convolution layer having a convolution kernel of size 3×1, where 3 is the width and 1 is the height, although in other examples, the depth-wise convolution layer may have a smaller or larger convolution kernel size e.g., a 1×1 kernel or a 5×1 kernel.

The attention sub-layer 420 then combines the initial outputs of the attention heads to generate the final output of the attention sub-layer 420. For example, the attention sub-layer concatenates the initial outputs of the attention heads and applies a learned linear transformation to the concatenated output to generate the output of the attention sub-layer. In some cases, the attended input sequence 424 is the final output of the attention mechanism. In some other cases, the attention sub-layer applies one or more other operations, e.g., residual connections, layer normalization, or both, to the final output to generate the attended input sequence 424.

The feed-forward sub-layer 430 then operates on the attended input sequence 424 to generate an output sequence 434 for the attention layer 410. The feed-forward sub-layer 430 is configured receive the attended input sequence and apply a sequence of transformations to the attended input sequence to generate the output sequence from the attended input sequence.

In conventional attention neural networks, the sequence of transformations generally include one linear transformation applied to the attended input sequence, followed by an activation function, e.g., a non-linear element-wise activation function, e.g., a rectified linear unit (RcLU) activation function, and then followed by another linear transformation.

In the described attention neural network 450, however, the feed-forward sub-layers 430 apply a different set of transformations.

FIG. 5B shows the operations performed by the feed-forward sub-layer 430 for the attended input sequence 424. As shown, the feed-forward sub-layer generates a first transformed input sequence 425 by applying a first learned linear transformation to the attended input sequence 424.

The feed-forward sub-layer applies a rectified polynomial activation function to the first transformed input sequence to generate the activated input sequence 426. One example of this is a squared ReLU activation function, e.g., rather than a ReLU activation function that has been previously more commonly used. That is, the feed-forward sub-layer can apply a squared ReLU activation function to the first transformed input sequence to generate the activated input sequence 426. In particular, the squared ReLU activation function includes a ReLU activation function $f(x)=\max(0, x)$ followed by a square function $f(x)=x^2$. The use of square function improves the nonlinear transformation within the attention neural network without additional parameters. This specification demonstrates, for the first time, the usefulness of rectified polynomial activations of varying degrees in attention neural networks, e.g., Transformers.

Figure 8:
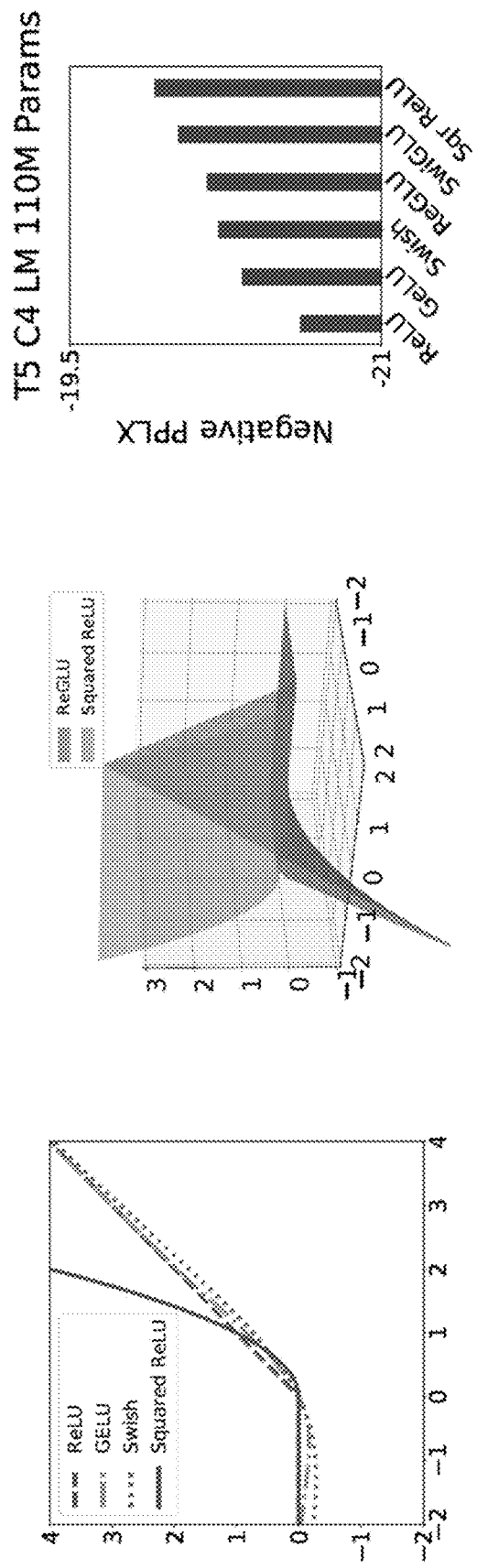
FIG. 8 shows a quantitative example of the performance gains that can be achieved by using squared ReLU activation functions in an attention neural network.

FIG. 8 shows a quantitative example of the performance gains that can be achieved by using squared ReLU activation functions in an attention neural network. Specifically, FIG. 8 shows a comparison of different nonlinearities in Transformers trained on C4 auto-regressive LM dataset for about 525 K steps. On the left, FIG. 8 shows that squared ReLU has different asymptotics compared to other common activation functions. On the center, FIG. 8 shows that squared ReLU has some overlap with GLU variants that use activations with ReLU-like asymptotics, such as ReGLU and SwiGLU. On the right, FIG. 8 shows that squared ReLU is better than these GLU variants in Transformer language models, where "negative pplx" stands for "negative perplexity" and greater negative perplexity scores indicate better performance (e.g., an output having a negative perplexity score of −19.5 is better than an output having a negative perplexity score of −21). Squared ReLUs capture the benefits of these GLU variants, while being simpler without additional parameters, and delivering better quality.

The feed-forward sub-layer generates a second transformed input sequence 427 by applying a second learned linear transformation to the activated input sequence. In some cases, the second transformed input sequence 427 is used as the output sequence 434 for the attention layer 410. In other cases, the feed-forward sub-layer 430 applies one or more other operations, e.g., residual connections, layer normalization, or both, to the second transformed input sequence 427 to generate the output sequence 434. In some of these cases, the feed-forward sub-layer 430 can apply a modified version of layer normalization that uses $x(x-\mu)$ to the second transformed input sequence, instead of $(x-\mu)^2$ that has been previously more commonly used in layer normalization.

The output sequence 434 may be provided as input to the next attention layer or other components of the attention neural network 450 for further processing, or may be used to generate the output 452 of the neural network system 400.

The attention neural network 450 may include one or more output layers that are configured to receive the output of the final attention layer of the multiple attention layers in the attention neural network 450. The one or more output layers are configured to process the output of the final attention layer to generate the output 452 of the neural network system 400.

Figure 6:
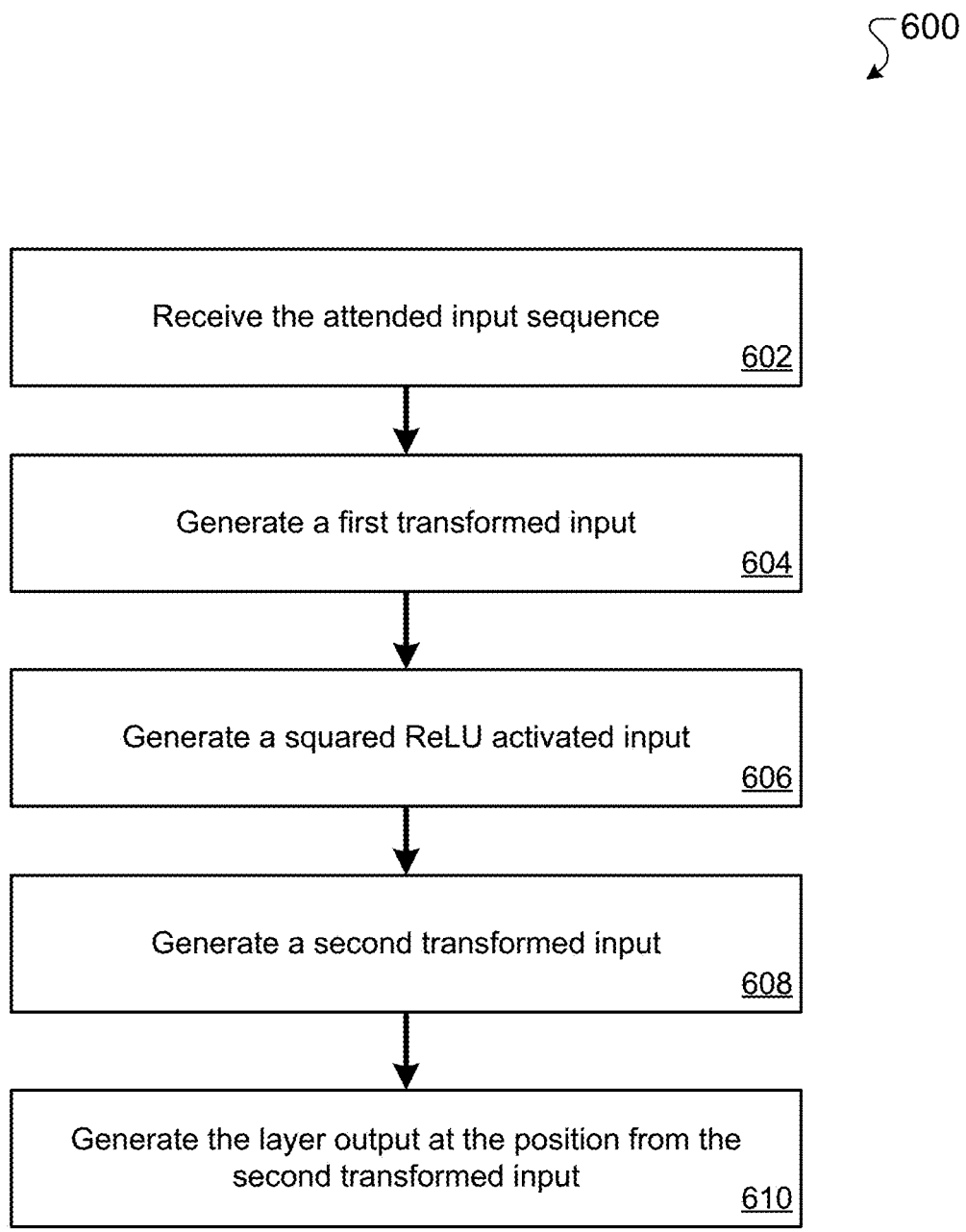
FIG. 6 is a flow diagram of an example process for generating an output sequence for an attention layer from an attended input sequence.

FIG. 6 is a flow diagram of an example process 600 for generating an output sequence for an attention layer from an attended input sequence. For convenience, the process 600 will be described as being performed by a system of one or more computers located in one or more locations. For example, a neural network system, e.g., neural network system 400 of FIG. 4, appropriately programmed in accordance with this specification, can perform the process 600.

In general, the system receives, at a feed-forward sub-layer included in an attention layer, an attended input sequence that includes a respective attended input at each of one or more positions (step 602).

The attended input sequence was generated by an attention sub-layer within the attention layer that is configured to receive an input sequence for the attention layer that includes a respective layer input at each of the one or more positions and generate the attended input sequence at least in part by applying an attention mechanism to the input sequence for the layer.

The system then performs the following steps 604-610 to generate, from the attended input sequence, an output sequence for the attention layer that includes a respective layer output at each of the one or more positions.

In some implementations, the feed-forward sub-layer can be configured to operate on each position in the attended input sequence separately, i.e., in a position-wise manner. In these implementations, the transformations applied by the feed-forward sub-layer will generally be the same for each position (but different feed-forward sub-layers in the attention neural network will apply different transformations).

The system generates, by the feed-forward sub-layer and for each of the one or more positions, a first transformed input (step 604), at least in part by applying a first linear transformation to the attended layer input at the position.

The system generates, by the feed-forward sub-layer and for each of the one or more positions, a squared ReLU activated input at the position (step 606). In particular, for each of the one or more positions, the system first applies a ReLU activation function to the first transformed input to generate a ReLU activated input, and then applies a square function to the ReLU activated input to generate the squared ReLU activated input.

The system generates, by the feed-forward sub-layer and for each of the one or more positions, a second transformed input (step 608), at least in part by applying a second linear transformation to the squared ReLU activated input at the position.

The system generates, by the feed-forward sub-layer and for each of the one or more positions, the layer output at the position from the second transformed input (step 610).

Figure 7:
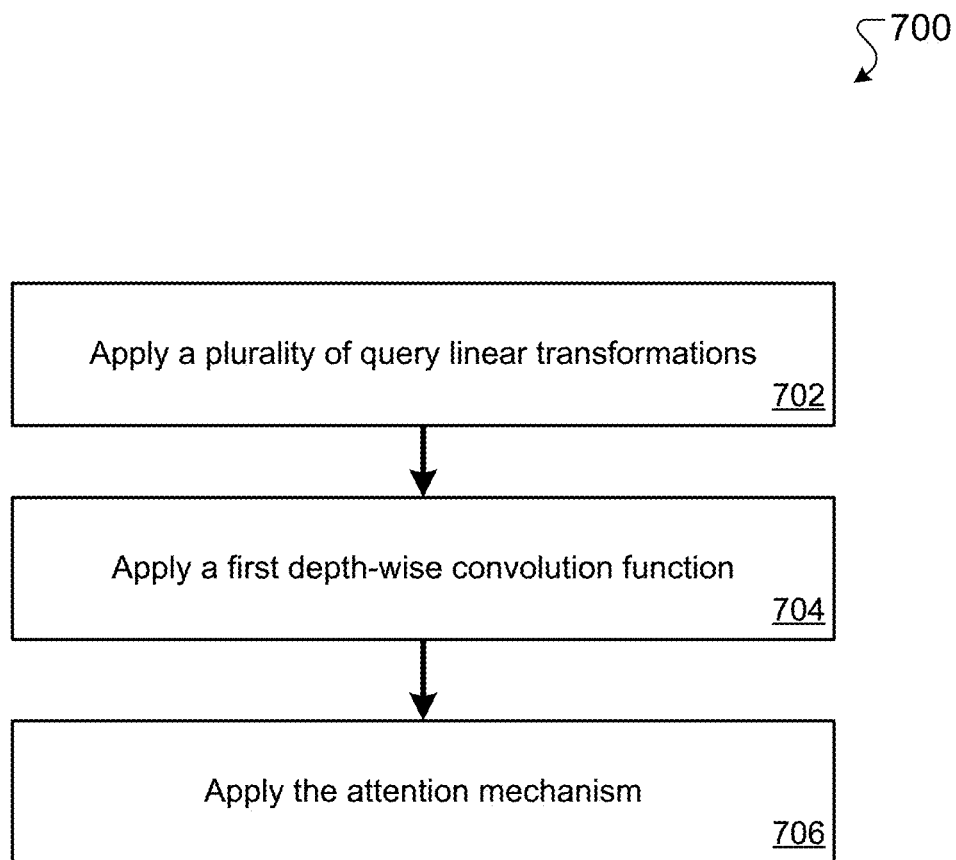
FIG. 7 is a flow diagram of an example process for generating an attended input sequence from an input sequence.

FIG. 7 is a flow diagram of an example process 700 for generating an attended input sequence from an input sequence. For convenience, the process 700 will be described as being performed by a system of one or more computers located in one or more locations. For example, a neural network system, e.g., neural network system 400 of FIG. 4, appropriately programmed in accordance with this specification, can perform the process 700.

The system receives an input sequence at an attention layer. The input sequence has a respective layer input at each of one or more input positions in an input order. In some implementations, the input sequence can be derived from an output of a previous attention layer of the attention neural network. In some other implementations, the input sequence can be derived from an input of the attention neural network.

The system then performs the following steps 702-706 to generate, at least in part by applying an attention mechanism to the input sequence, an attended input sequence that includes a respective attended layer input at each of one or more output positions in an output order.

The system applies, by an attention sub-layer included in the attention layer, a plurality of query linear transformations to the layer inputs or data derived from the layer inputs to generate a plurality of query vectors (step 702). The attention sub-layer can generate one or more query vectors for the respective layer input at each input position in the input sequence. In some implementations, the query linear transformations applied by the attention sub-layer are the same for each input position (but different attention sub-layers in the attention neural network will apply different transformations).

Similarly, the system applies a plurality of key linear transformations to the layer inputs or data derived from the layer inputs to generate a plurality of key vectors. The system applies a plurality of value linear transformations to the layer inputs or data derived from the layer inputs to generate a plurality of value vectors The system applies, by the attention sub-layer included the attention layer, a first depth-wise convolution function to the plurality of query vectors to generate a plurality of modified query vectors (step 704).

Similarly, the system applies a second depth-wise convolution function to the plurality of key vectors to generate a plurality of modified key vectors. The system applies a third depth-wise convolution function to the plurality of value vectors to generate a plurality of modified value vectors.

In some implementations, the first, second, third depth-wise convolution layers are each respective a depth-wise 2-D convolution function having a convolution kernel of a limited size, e.g., size 3×1, where 3 is the width and 1 is the height.

The system applies, by the attention sub-layer included the attention layer, the attention mechanism over the respective layer inputs in the input sequence using the plurality of modified query vectors, the plurality of modified key vectors, and the plurality of modified value vectors (step 706).

The system generates the attended input sequence from the output of the mechanism.

For each attention layer in the attention neural network, the system can repeatedly perform the process 600 (i.e., at each of one or more feed-forward sub-layers included in the attention layer) to update the attended input sequence to the layer. Likewise, the system can repeatedly perform the process 700 (i.e., at each of one or more attention sub-layers included in the attention layer) to update the input sequence to the layer. By repeatedly performing the processes 600 and 700 for all of the attention layers in the attention neural network and then by processing at least part of the output sequence generated by the last attention layer in the attention neural network using one or more output layers, the system can generate a network output for a received network input.

That is, the processes 600 and 700 can be performed as part of predicting an output for an input for which the desired output, i.e., the output that should be generated by the system for the input sequence, is not known.

The processes 600 and 700 can also be performed as part of processing inputs derived from a set of training data, i.e., inputs derived from a set of inputs for which the output that should be generated by the system is known, in order to train the attention neural network to determine trained values for the parameters of the attention neural network. The system can repeatedly perform the processes 600 and 700 on inputs selected from a set of training data as part of a conventional machine learning training technique to train the attention layers and the output layer(s) of the attention neural network, e.g., a gradient descent with backpropagation training technique that uses a conventional optimizer, e.g., stochastic gradient descent, RMSprop, Adafactor optimizer, or Adam optimizer, to optimize an objective function that is appropriate for the task that the attention neural network is configured to perform. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel. Moreover, the system can first pre-train the attention neural network on a large unsupervised data set through unsupervised learning, e.g., to minimize a BERT loss or other unsupervised loss, and then fine-tune the attention neural network on task-specific training data to optimize the objective function for the task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently. Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:
    an attention neural network configured to perform the machine learning task, the attention neural network comprising one or more layers, each layer comprising an attention sub-layer and a feed-forward sub-layer, the attention sub-layer configured to:
        receive an input sequence for the layer comprising a respective layer input at each of a plurality of positions; and
        generate an attended input sequence at least in part by applying an attention mechanism that uses a softmax activation function over the input sequence for the attention sub-layer, the attended input sequence comprising a respective attended layer input at each of the plurality of positions, and the feed-forward sub-layer configured to:
    receive the attended input sequence from the attention sub-layer; and
    generate an output sequence for the feed-forward sub-layer from the attended input sequence, the output sequence comprising a respective layer output at each of the plurality of positions, and the generating comprising, for each of the plurality of positions:
        applying a first linear transformation to the attended layer input at the position to generate a first transformed input at the position, comprising;
        applying a rectified polynomial activation function with a degree higher than one to the first transformed input to generate a rectified polynomial activated input at the position;
        applying a second linear transformation to the rectified polynomial activated input at the position to generate a second transformed input at the position; and
        generating the respective layer output at the position from the second transformed input at the position.

2. The system of claim 1, wherein the rectified polynomial activation function with a degree higher than one comprises a squared ReLU activation function, and wherein applying the rectified polynomial activation function with a degree higher than one to the first transformed input to generate the rectified polynomial activated input at the position comprises:
    applying a ReLU activation function to the first transformed input to generate a ReLU activated input at the position; and
    applying a square function to the ReLU activated input to generate a squared ReLU activated input at the position.

3. The system of claim 1, wherein generating the respective layer output at the position from the second transformed input at the position comprises:
    applying a residual connection to the second transformed input to generate the respective layer output at the position.

4. The system of claim 1, wherein generating the respective layer output at the position from the second transformed input at the position comprises:
    applying a layer normalization to the second transformed input to generate the respective layer output at the position.

5. The system of claim 1, wherein the attention neural network is configured to provide the output sequence for the feed-forward sub-layer to another layer in the attention neural network for further processing.

6. The system of claim 1, wherein the attention mechanism comprises a multi-head depth-wise convolution attention mechanism.

7. The system of claim 1, wherein the machine learning task comprises:
    an audio processing task, wherein the network input is a sequence representing a spoken utterance, and the network output is a piece of text that is a transcript of the utterance, an indication whether a particular word or phrase was spoken in the utterance, or an identification of a natural language in which the utterance was spoken;

a text to speech task, wherein the network input is text in a natural language or features of text in a natural language, and the network output is a spectrogram, a waveform, or other data defining audio of the text being spoken in the natural language;

a computer vision task, wherein the network input is an image or a point cloud, and the network output is a computer vision output for the image or point cloud, and optionally wherein the computer vision output is a classification output including a score for each of a plurality of categories, each score representing the likelihood that the image or point cloud includes an object belonging to the category;

an image generation task, wherein the network input is a conditioning input, and the network output is a sequence of intensity value inputs for the pixels of an image;

a neural machine translation task, wherein the network input is a sequence of text in one language, and the network output is a translation of the sequence of text into another language;

an agent control task, wherein the network input is a sequence of observations or other data characterizing states of an environment, and the network output defines an action to be performed by the agent in response to a most recent data in the sequence;

a health prediction task, wherein the network input is a sequence derived from electronic health record data for a patient, and the network output is a predicted diagnosis for the patient; or a genomics task, wherein the network input is a sequence representing a fragment of a DNA sequence or other molecule sequence, and the network output is either an embedding of the fragment for use in a downstream task, or an output for the downstream task.

8. One or more non-transitory computer-readable storage media storing instructions that when executed by one or more computers cause the one or more computers to implement an attention neural network configured to perform a machine learning task on a network input to generate a network output, the attention neural network comprising one or more layers, each layer comprising an attention sub-layer and a feed-forward sub-layer, the attention sub-layer configured to:

receive an input sequence for the layer comprising a respective layer input at each of a plurality of positions;

and generate an attended input sequence at least in part by applying an attention mechanism that uses a softmax activation function over the input sequence for the attention sub-layer, the attended input sequence comprising a respective attended layer input at each of the plurality of positions, and the feed-forward sub-layer configured to:

receive the attended input sequence from the attention sub-layer;

and generate an output sequence for the feed-forward sub-layer from the attended input sequence, the output sequence comprising a respective layer output at each of the plurality of positions, and the generating comprising, for each of the plurality of positions:

applying a first linear transformation to the attended layer input at the position to generate a first transformed input at the position, comprising;

applying a rectified polynomial activation function with a degree higher than one to the first transformed input to generate a rectified polynomial activated input at the position;

applying a second linear transformation to the rectified polynomial activated input at the position to generate a second transformed input at the position; and generating the respective layer output at the position from the second transformed input at the position.

9. The non-transitory computer-readable storage media of claim 8, wherein the rectified polynomial activation function with a degree higher than one comprises a squared ReLU activation function, and wherein applying the rectified polynomial activation function with a degree higher than one to the first transformed input to generate the rectified polynomial activated input at the position comprises:

applying a ReLU activation function to the first transformed input to generate a ReLU activated input at the position; and applying a square function to the ReLU activated input to generate a squared ReLU activated input at the position.

10. The non-transitory computer-readable storage media of claim 8, wherein generating the respective layer output at the position from the second transformed input at the position comprises:

applying a residual connection to the second transformed input to generate the respective layer output at the position.

11. The non-transitory computer-readable storage media of claim 8, wherein generating the respective layer output at the position from the second transformed input at the position comprises:

applying a layer normalization to the second transformed input to generate the respective layer output at the position.

12. The non-transitory computer-readable storage media of claim 8, wherein the attention neural network is configured to provide the output sequence for the feed-forward sub-layer to another layer in the attention neural network for further processing.

13. The non-transitory computer-readable storage media of claim 8, wherein the attention mechanism comprises a multi-head depth-wise convolution attention mechanism.

14. The non-transitory computer-readable storage media of claim 8, wherein the machine learning task comprises:

an audio processing task, wherein the network input is a sequence representing a spoken utterance, and the network output is a piece of text that is a transcript of the utterance, an indication whether a particular word or phrase was spoken in the utterance, or an identification of a natural language in which the utterance was spoken;

a text to speech task, wherein the network input is text in a natural language or features of text in a natural language, and the network output is a spectrogram, a waveform, or other data defining audio of the text being spoken in the natural language;

a computer vision task, wherein the network input is an image or a point cloud, and the network output is a computer vision output for the image or point cloud, and optionally wherein the computer vision output is a classification output including a score for each of a plurality of categories, each score representing the likelihood that the image or point cloud includes an object belonging to the category;

an image generation task, wherein the network input is a conditioning input, and the network output is a sequence of intensity value inputs for the pixels of an image;

a neural machine translation task, wherein the network input is a sequence of text in one language, and the network output is a translation of the sequence of text into another language;

an agent control task, wherein the network input is a sequence of observations or other data characterizing states of an environment, and the network output defines an action to be performed by the agent in response to a most recent data in the sequence;

a health prediction task, wherein the network input is a sequence derived from electronic health record data for a patient, and the network output is a predicted diagnosis for the patient;

or a genomics task, wherein the network input is a sequence representing a fragment of a DNA sequence or other molecule sequence, and the network output is either an embedding of the fragment for use in a downstream task, or an output for the downstream task.

15. A computer-implemented method for performing a machine learning task on a network input to generate a network output, wherein the method comprises:

receiving, at an attention sub-layer of an attention neural network, an input sequence for the attention sub-layer comprising a respective layer input at each of a plurality of positions; and generating an attended input sequence at least in part by applying an attention mechanism that uses a softmax activation function over the input sequence for the attention sub-layer, the attended input sequence comprising a respective attended layer input at each of the plurality of positions;

receiving, at a feed-forward sub-layer of the attention neural network, the attended input sequence from the attention sub-layer; and generating an output sequence for the feed-forward sub-layer from the attended input sequence, the output sequence comprising a respective layer output at each of the plurality of positions, and the generating comprising, for each of the plurality of positions:

applying a first linear transformation to the attended layer input at the position to generate a first transformed input at the position, comprising:

applying a rectified polynomial activation function with a degree higher than one to the first transformed input to generate a rectified polynomial activated input at the position;

applying a second linear transformation to the rectified polynomial activated input at the position to generate a second transformed input at the position; and generating the respective layer output at the position from the second transformed input at the position.

16. The method of claim 15, wherein the rectified polynomial activation function with a degree higher than one comprises a squared ReLU activation function, and wherein applying the rectified polynomial activation function with a degree higher than one to the first transformed input to generate the rectified polynomial activated input at the position comprises:

applying a ReLU activation function to the first transformed input to generate a ReLU activated input at the position; and applying a square function to the ReLU activated input to generate a squared ReLU activated input at the position.

17. The method of claim 15, wherein generating the respective layer output at the position from the second transformed input at the position comprises:

applying a residual connection to the second transformed input to generate the respective layer output at the position.

18. The method of claim 15, wherein generating the respective layer output at the position from the second transformed input at the position comprises:

applying a layer normalization to the second transformed input to generate the respective layer output at the position.

19. The method of claim 15, wherein the attention neural network is configured to provide the output sequence for the feed-forward sub-layer to another layer in the attention neural network for further processing.

20. The method of claim 15, wherein the attention mechanism comprises a multi-head depth-wise convolution attention mechanism.

21. The method of claim 15, wherein the machine learning task comprises:

an audio processing task, wherein the network input is a sequence representing a spoken utterance, and the network output is a piece of text that is a transcript of the utterance, an indication whether a particular word or phrase was spoken in the utterance, or an identification of a natural language in which the utterance was spoken;

a text to speech task, wherein the network input is text in a natural language or features of text in a natural language, and the network output is a spectrogram, a waveform, or other data defining audio of the text being spoken in the natural language;

a computer vision task, wherein the network input is an image or a point cloud, and the network output is a computer vision output for the image or point cloud, and optionally wherein the computer vision output is a classification output including a score for each of a plurality of categories, each score representing the likelihood that the image or point cloud includes an object belonging to the category;

an image generation task, wherein the network input is a conditioning input, and the network output is a sequence of intensity value inputs for the pixels of an image;

a neural machine translation task, wherein the network input is a sequence of text in one language, and the network output is a translation of the sequence of text into another language;

an agent control task, wherein the network input is a sequence of observations or other data characterizing states of an environment, and the network output defines an action to be performed by the agent in response to a most recent data in the sequence;

a health prediction task, wherein the network input is a sequence derived from electronic health record data for a patient, and the network output is a predicted diagnosis for the patient; or a genomics task, wherein the network input is a sequence representing a fragment of a DNA sequence or other molecule sequence, and the network output is either an embedding of the fragment for use in a downstream task, or an output for the downstream task.

\* \* \* \* \*